United States Patent
Midorikawa

(10) Patent No.: US 10,788,466 B2
(45) Date of Patent: Sep. 29, 2020

(54) SAMPLE INTRODUCTION SYSTEM

(71) Applicant: SHIMADZU CORPORATION, Kyoto-shi, Kyoto (JP)

(72) Inventor: Yusuke Midorikawa, Kyotanabe (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 321 days.

(21) Appl. No.: 15/312,205

(22) PCT Filed: May 20, 2014

(86) PCT No.: PCT/JP2014/063316
§ 371 (c)(1),
(2) Date: Nov. 18, 2016

(87) PCT Pub. No.: WO2015/177857
PCT Pub. Date: Nov. 26, 2015

(65) Prior Publication Data
US 2017/0089870 A1    Mar. 30, 2017

(51) Int. Cl.
*G01N 35/10* (2006.01)
*G01N 30/24* (2006.01)
*G01N 35/00* (2006.01)

(52) U.S. Cl.
CPC ....... *G01N 30/24* (2013.01); *G01N 35/00732* (2013.01); *G01N 35/10* (2013.01);
(Continued)

(58) Field of Classification Search
CPC ....... G01N 35/00693; G01N 2001/002; G01N 2001/1427; G01N 2001/1417;
(Continued)

(56) References Cited

U.S. PATENT DOCUMENTS

2006/0046298 A1* 3/2006 Key ............... G01N 1/30
436/43
2006/0051246 A1* 3/2006 Toi ............... G01N 35/1011
422/561
(Continued)

FOREIGN PATENT DOCUMENTS

JP    2000146775 A  *  5/2000
JP    2012132694 A  *  7/2012
JP    2012-185001 A     9/2012

OTHER PUBLICATIONS

English Translation of JP-2012132694-A, Jul. 2012.*
(Continued)

*Primary Examiner* — Alexander A Mercado
(74) *Attorney, Agent, or Firm* — Sughrue Mion, PLLC

(57) ABSTRACT

Provided is a sample introduction system for sequentially introducing a plurality of samples into an analyzer 200, the system including: an auto-sampler 300 including a sampling needle 302 for suctioning a sample from each well 312 provided in a plate 311 placed on a sample rack 310 or from a sample container 313 placed in the well 312, and a needle drive mechanism 303 for driving the sampling needle 302 in horizontal and vertical directions; an operation section 10 for allowing a user to command the needle drive mechanism 303 to drive the sampling needle 302; and a display controller 28 for displaying, on a screen of a display section 30, an identification of the well 312 related to a reference point defined on the plate 311 in a correction process conducted by the user by manipulating the operation section 10 so as to operate the needle drive mechanism 303 so that the sampling needle 302 is transferred to a predetermined position serving as the reference point.

6 Claims, 6 Drawing Sheets

(52) U.S. Cl.
CPC ....... *G01N 35/109* (2013.01); *G01N 35/1011* (2013.01); *G01N 2035/0091* (2013.01); *G01N 2035/00801* (2013.01); *G01N 2035/00831* (2013.01); *G01N 2035/00891* (2013.01)

(58) Field of Classification Search
CPC ......... G01N 35/00732; G01N 35/1011; G01N 35/109; G01N 35/00594; G01N 2035/00891; G01N 2035/0091; G01N 2035/00801
USPC ...................................................... 73/863.01
See application file for complete search history.

(56) References Cited

U.S. PATENT DOCUMENTS

2014/0024133 A1* 1/2014 Carter, Jr. ........... B01F 11/0085
  436/174
2014/0304964 A1* 10/2014 Yeck ...................... B01L 9/523
  29/407.1

OTHER PUBLICATIONS

English Translation of JP 2000-146775, 2000.*
International Search Report of PCT/JP2014/063316, dated Aug. 26, 2014 [PCT/ISA/210].
Written Opinion for PCT/JP2014/063316 dated Aug. 26, 2014. [PCT/ISA/237].

* cited by examiner

| Position # | For 1mL Sample Bottles | | For 1.5mL Sample Bottles | | For 4mL Sample Bottles | | 96-Hole MTP/DWP | | 384-Hole MTP/DWP | |
|---|---|---|---|---|---|---|---|---|---|---|
| | Well | Plate | Well | Plate | Well | Plate | Well | Plate | Well | Plate |
| 1 | 1 | 1 | 1 | 1 | 1 | 1 | A01 | 1 | A01 | 1 |
| 2 | 73 | 1 | 46 | 1 | 22 | 1 | H01 | 1 | P01 | 1 |
| 3 | 12 | 1 | 9 | 1 | 7 | 1 | A12 | 1 | A24 | 1 |
| 4 | 1 | 2 | 1 | 2 | 1 | 2 | A01 | 2 | A01 | 2 |

| Plate | Well | x' | y' |
|---|---|---|---|
| 1 | 1 | 88 | 904 |
| 1 | 2 | 88 | 857 |
| 1 | 3 | 88 | 810 |
| 1 | 4 | 88 | 763 |
| 1 | 5 | 88 | 716 |
| ⋮ | ⋮ | ⋮ | ⋮ |
| 1 | 52 | 331 | 622 |
| 1 | 53 | 331 | 575 |
| 1 | 54 | 331 | 528 |
| 2 | 1 | 88 | 447 |
| 2 | 2 | 88 | 400 |
| 2 | 3 | 88 | 353 |
| 2 | 4 | 88 | 306 |
| 2 | 5 | 88 | 259 |
| ⋮ | ⋮ | ⋮ | ⋮ |
| 2 | 52 | 331 | 165 |
| 2 | 53 | 331 | 118 |
| 2 | 54 | 331 | 71 |

SAMPLE INTRODUCTION SYSTEM

This is a National Stage of International Application No. PCT/JP2014/063316 filed May 20, 2014, the contents of all of which are incorporated herein by reference in their entirety.

TECHNICAL FIELD

The present invention relates to a sample introduction system including an auto-sampler for sequentially introducing a plurality of samples into an analyzer for analyzing samples.

BACKGROUND ART

For example, when a plurality of samples are automatically analyzed using a liquid chromatograph, an auto-sampler is used to sequentially introduce those samples into the liquid chromatograph. The auto-sampler contains a sample rack on which one or more plates can be placed, with each plate having a plurality of wells (holes with a closed bottom) in each of which a sample container (e.g. vial) is to be set or a sample is directly placed. The auto-sampler collects a predetermined amount of sample from each of these wells in a previously specified order and injects it into a mobile-phase passage in the liquid chromatograph.

The collection of the sample by the auto-sampler is performed by lowering a sampling needle until its tip is immersed in a liquid sample (if a septum (i.e. a cap of the sample container) or plate film is present, the needle penetrates through the septum or film), and then suctioning the liquid sample. The number of wells and their arrangement on one plate are specified for each type of plate. Accordingly, based on the information about the number of wells and their arrangement, the initial value of the descent position corresponding to each well is determined for each type of plate so that the needle will be automatically lowered into the center of the designated well. However, it is often the case that the tip of the needle lowered from the position based on the initial value reaches a considerably displaced position from the center of the well designated on the plate, due to an incorrect placement of the plate on the sample rack (particularly, due to its inclination or the like in the horizontal plane). Therefore, the task of calibrating the descent position for preventing the tip of the needle from missing the sample container (or well) has conventionally been performed as follows: Initially, the needle is transferred to and stopped at a position directly above one of the specific wells previously designated for each type of plate as the reference points for the calibration (for example, FIG. 10 shows four such wells as indicated by the filled circles, which are hereinafter called the "reference wells"), i.e. at the position designated as the initial value of the descent position corresponding to the aforementioned one of the wells. Subsequently, the user makes the needle gradually move downward and adjusts the position of the needle in the horizontal plane while visually checking that the needle penetrates the center of the selected reference well. After it has been confirmed that the needle penetrates the center of the reference well, the user commands the system to fix the descent position corresponding to the reference well.

As a result of such a calibration process, the difference value between the initial and fixed values of the descent position of the needle corresponding to each reference well due to an incorrect placement of the plate on the sample rack is calculated. In the process of collecting samples in an analysis, the descent position of the needle at each well is corrected based on the difference values.

CITATION LIST

Patent Literature

Patent Literature 1: JP 2012-185001 A

SUMMARY OF INVENTION

Technical Problem

As shown in FIG. 10, numbers for individual wells ("well numbers") are printed on the top surface of the plates. In the calibration process, the user visually refers to those printed numbers and adjusts the descent position of the needle. In the shown example, when position #1 is to be determined, the user adjusts the position of the needle in the horizontal plane so that the needle moving downward penetrates the center of well #1 on the first plate.

The calibration process may be inappropriately performed due to the user incorrectly recognizing the number of each reference well. For example, it is possible that the needle which has been positioned directly above well #9 of the first plate which corresponds to position #3 in FIG. 10 is incorrectly guided to the center of well #1 of the second plate which corresponds to position #4 (or another well next to position #3). An occurrence of such an error causes a discrepancy between the position of the wells and the descent position of the needle, which may possibly result in the inconvenient situation that the needle cannot collect the sample from the designated well in the analysis.

Users can prevent the previously described error by referring to the manual of the analyzer and checking the number of the reference well corresponding to each reference position for each type of plate. However, such a task is likely to be burdensome for users.

The present invention has been developed in view of such a situation. Its objective is to provide a sample-analyzing system (or similar devices) capable of easily preventing an incorrect adjustment of the position by users in the process of calibrating the descent position of the sampling needle.

Solution to Problem

The sample introduction system according to the present invention developed for solving the previously described problem is a system for sequentially introducing a plurality of samples into an analyzer which analyzes a sample contained in each of the wells provided on a plate placed on a sample rack or a sample contained in a sample container placed in each of the wells, the system including:

a) an auto-sampler including a sampling needle for suctioning the sample from each of the wells or the sample container and a needle drive mechanism for driving the sampling needle in horizontal and vertical directions;

b) an operation section for allowing a user to command the needle drive mechanism to drive the sampling needle; and c) a display controller for displaying, on a screen of a display section, an identification of the well related to a reference point defined on the plate in a calibration process conducted by the user by manipulating the operation section so as to operate the needle drive mechanism so that the sampling needle is transferred to a predetermined position serving as the reference point.

The operation section may be provided in the auto-sampler, or it may be provided in a controller connected to the auto-sampler. It can also be provided as an independent unit apart from these devices. In summary, its location is not specifically limited.

As the identification of the well, for example, the aforementioned well number can be used. In the case where a plurality of plates can be placed on the sample rack, the display controller may display, in addition to the identification of the well, an identification of the plate in which the well in question is provided.

According to the previously described configuration, when the calibration process for transferring the sampling needle to a predetermined position serving as the reference point on the plate is performed, the identification of the well related to the reference point is displayed on the screen of the display section. By referring to this display section in the calibration process, users can easily recognize the identification of the well to which the needle should be guided. Therefore, by comparing the displayed identification of the well and the identification (well number, for example) printed on the top surface of the plate, users can guide the needle to the correct well, whereby an incorrect adjustment of the position in the calibration process can be prevented.

Preferably, the previously described sample introduction system should further include:

d) a plate identifier for determining the type of the plate placed on the sample rack; and e) a well identification determiner for determining the identification of the well related to the reference point for each type of plate determined by the plate identifier, and the display controller displays, on the screen of the display section, the identification of the well determined by the well identification determiner.

According to this configuration, in the case where each different type of plate has different wells related to the reference points, users do not need to perform the task of referring to the manual of the analyzer before carrying out an analysis using a different type of plate. This contributes to an improvement in the user-friendliness of the system.

The display controller may preferably display, on the screen of the display section, an image showing the position on the plate of the well related to the reference point, along with the identification of the same well, in the calibration process.

According to this configuration, users can visually recognize the position on the plate of the well to which the needle should be guided, whereby an incorrect adjustment of the position is even more effectively prevented.

Advantageous Effects of the Invention

According to the present invention, an incorrect adjustment of the position by users can be easily prevented in the process of calibrating the descent position of the sampling needle.

BRIEF DESCRIPTION OF DRAWINGS

FIG. 6A shows an example of the display at the beginning of the calibration process, while FIG. 6B shows an example of the display in the process of adjusting the descent position for position #1.

DESCRIPTION OF EMBODIMENTS

Modes for carrying out the present invention are hereinafter described in detail with reference to the drawings. In the following descriptions, any member having the same function as one already described in a foregoing drawing will be denoted by the same numeral, and its description will be omitted.

First Embodiment

Figure 1:
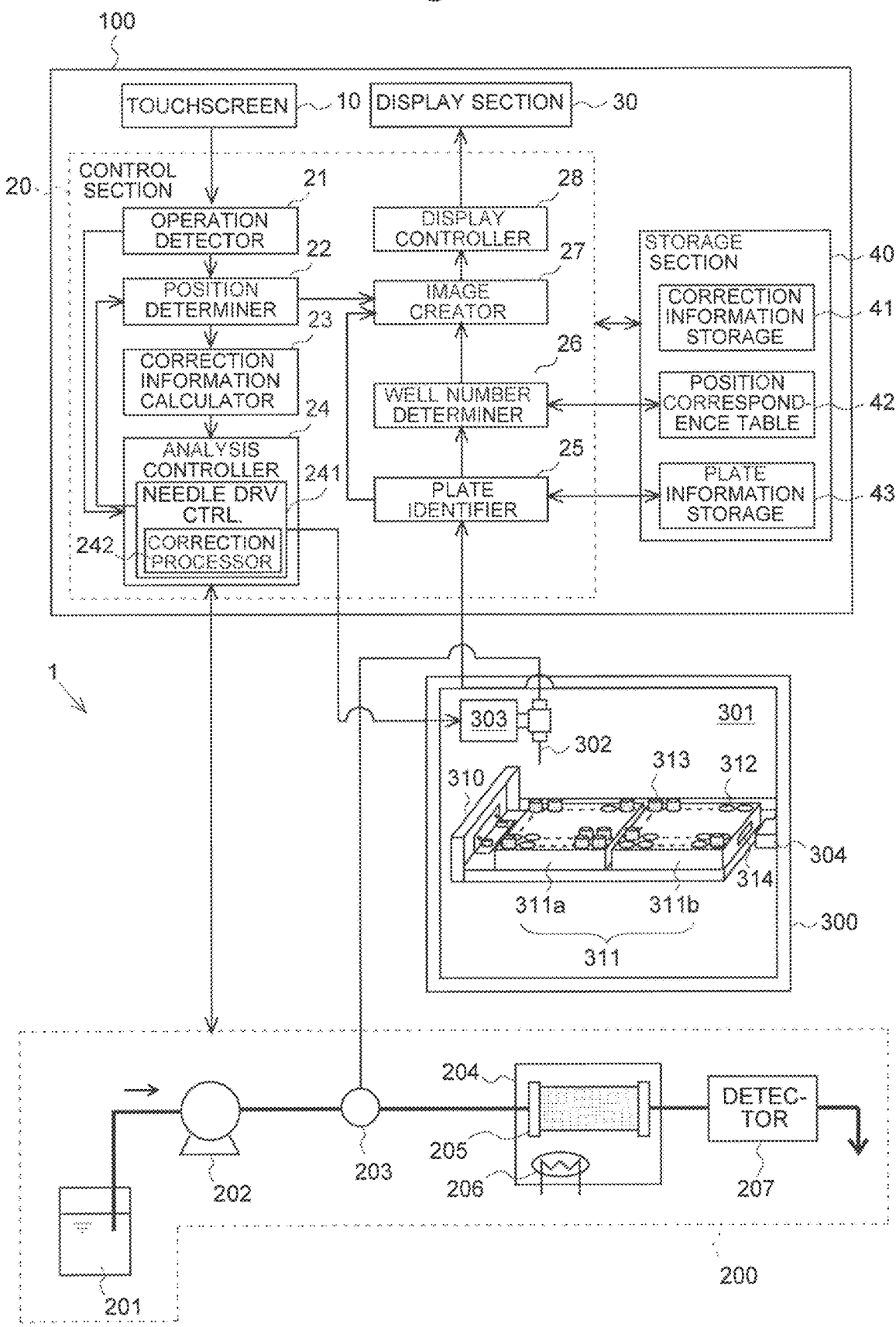
FIG. 1 is a block diagram showing a schematic configuration of a sample-analyzing system including a sample introduction system according to the first embodiment of the present invention.

FIG. 1 is a block diagram showing a schematic configuration of a sample-analyzing system including a sample introduction system according to the first embodiment of the present invention. The sample-analyzing system 1 includes a controller 100, liquid chromatograph (LC) 200 and auto-sampler 300. Among these devices, the controller 100 and auto-sampler 300 constitute the system which corresponds to the sample introduction system of the present invention.

It should be noted that the LC 200 is one example of the analyzer in the present invention. The present invention allows the use of other types of analyzers, such as a liquid chromatograph mass spectrometer (LC-MS), gas chromatograph (GC), gas chromatograph mass spectrometer (GC-MS) or spectrophotometer.

Figures 2, 3, 4:
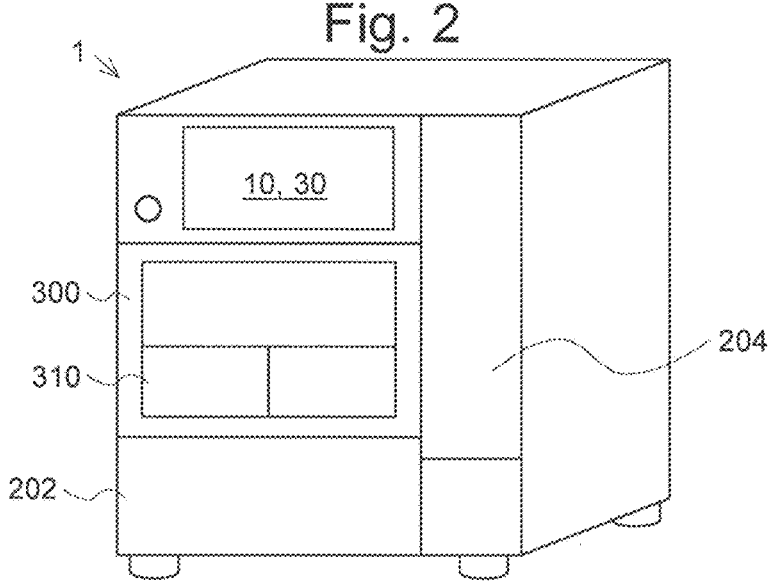
FIG. 2 is a perspective view showing an external appearance of the sample-analyzing system shown in FIG. 1.
FIG. 3 is an example of the data structure of the position correspondence table referenced in the embodiment.
FIG. 4 is an example of the data structure of the well coordinates table referenced in the embodiment, which shows the descent-position coordinates of the sampling needle for each well of a plate for 1.5-mL sample bottles.

The sample-analyzing system 1 is realized as a single apparatus, as shown in FIG. 2. Alternatively, a control computer consisting of a workstation, personal computer (PC) or similar device may be externally coupled with the controller 100 via a wired or wireless connection, with the control computer configured to allow users to manage analyzing tasks as well as analyze and process data obtained with the LC 200.

The LC 200 includes a liquid-sending pump 202 for sending a mobile phase held in a mobile phase container 201, an injector 203 for injecting a liquid sample into a mobile-phase passage, a column oven 204 containing a column 205, with a heater 206 for maintaining the column 205 at a predetermined temperature, and a detector 207 for detecting sample components sequentially eluted from the column 205.

Connected to the injector 203 is an auto-sampler 300 for collecting a predetermined amount of liquid sample to be injected into the mobile-phase passage. The auto-sampler 300 includes a sample-rack container unit 301 which can contain a sample rack 310 carrying two plates 311 (first plate 311a and second plate 311b). It also includes a sampling needle 302 for suctioning a sample from a sample container 313 held in each well 312 on the plate 311 and a needle drive mechanism 303 for driving the sampling needle 302 in the horizontal and vertical directions.

The sample-rack container unit 301 has a photosensor 304 on its wall surface. The plate 311 on the sample rack 310 has a recognition area 314 for indicating the type of plate 311. On the recognition area 314, identification information whose content differs for each type of plate 311 is provided in a specific form, such as a barcode or QR Code®. When the placement of the sample rack 310 in the sample-rack container unit 301 is detected with a placement sensor (not shown), the photosensor 304 reads the identification information on the recognition area 314. The result read by the photosensor 304 is sent to a plate identifier 25 in the controller 100.

As another example of the identification information representing the type of plate 311, a non-contact IC tag, such as an RFID (radio-frequency identification) may be provided on the recognition area 314. In this case, the auto-sampler 300 should be provided with a reader for reading the IC tag in place of the photosensor 304. It is also possible to use the technique described in Patent Literature 1.

The controller 100 is actually a computer provided with a touchscreen 10 (which corresponds to the operation section in the present invention), control section 20, display section 30 and storage section 40. Additionally, a communication means for controlling the connection with the aforementioned external control computer may also be provided in the controller 100.

The touchscreen 10 is a means for sensing a touch operation (the presence of a pointing object on or close to the screen) by a user and can be realized using, for example, a capacitive or resistive-film touchscreen. In the present embodiment, the adjustment of the descent position of the sampling needle 302 is performed by an input operation through the touchscreen 10.

The control section 20 supervises the functions of the relevant elements in the controller 100 and controls the operation of the same controller 100. For example, the control section 20 is realized by a CPU (central processing unit) and other devices. The control section 20 includes various elements (which will be described later), which are realized by the CPU as the control section 20 by reading a program from the storage section 40 into a temporary memory area (not shown) formed in a RAM or similar volatile memory unit and executing the same program.

As shown in FIG. 1, the control section 20 includes, as its functional blocks, an operation detector 21, position determiner 22, calibration information calculator 23, analysis controller 24, plate identifier 25, well number determiner 26 (which corresponds to the well identification determiner and well identification determining means in the present invention), image creator 27 and display controller 28.

The operation detector 21 receives operation signals from the touchscreen 10 (e.g. in the case of the capacitive touchscreen, the capacitance value of each electrode). Based on the operation signals, the operation detector 21 determines the coordinates of the position where the touch operation by the user has occurred, and sends the coordinates as the operation information to the position determiner 22 and analysis controller 24 (both of which will be described later). For the determination of the coordinates, commonly known techniques can be used.

The position determiner 22 determines the coordinates of the descent position of the sampling needle 302 in the horizontal plane for the well 312 (reference well) corresponding to each reference position designated for the calibration. Specifically, upon receiving, from the operation detector 21, a piece of operation information which orders the fixation of the descent position of the sampling needle 302 for one reference well (e.g. a touch operation within the display area of a specific GUI (graphical user interface) button), the position determiner 22 obtains the coordinates of the current position of the sampling needle 302 in the horizontal plane from a needle drive controller 241 (which will be described later) and fixes this position as the descent position of the sampling needle 302 for the reference well concerned. It also saves those coordinates in a temporary memory area.

In the following description, the term "coordinates" as simply used in relation to the descent position of the sampling needle 302 and the central point of the well 312 (which corresponds to the reference point in the present invention) means the "coordinates in the horizontal plane" unless otherwise noted.

The calibration information calculator 23 calculates calibration information. Specifically, for each reference well, the calibration information calculator 23 calculates the difference between the values of the coordinates of the descent position of the sampling needle 302 determined by the position determiner 22 and their initial values registered in a well coordinates table 400 (which will be described later).

It should be noted that the aforementioned difference values are one example in the present embodiment. Values obtained by substituting the difference values into a specific equation may also be used as the calibration information.

The analysis controller 24 controls the operations of the LC 200 and the auto-sampler 300 so that the analysis as instructed by the user is correctly performed. Specifically, the analysis controller 24 determines analysis conditions (and other relevant values) based on the operation information obtained from the operation detector 21 and sends predetermined drive signals to the LC 200 and the auto-sampler 300 according to those analysis conditions (and other relevant values). The analysis controller 24 also obtains the result of the analysis by the LC 200 and displays the analysis result, currently set values and other pieces of information as a visual image on the screen of the display section 30 via the display controller 28. As another example, the analysis controller 24 may obtain, through a communication means (not shown), analysis conditions (and other relevant values) which have been set on an external control computer, and send predetermined drive signals to the LC 200 and the auto-sampler 300 according to the obtained analysis conditions (and other relevant values). The analysis controller 24 includes a needle drive controller 241.

The needle drive controller 241 sends the needle drive mechanism 303 drive signals for driving the sampling needle 302. Specifically, the needle drive controller 241 sends drive signals to the needle drive mechanism 303 so as to change the position of the sampling needle 302 in the horizontal and/or vertical direction by a predetermined amount according to an instruction from the user (or other information). The needle drive controller 241 defines the position of the sample needle 302 within the sample-rack container unit 301 by the three-dimensional coordinates (x, y, z). In the present example, z-axis is defined as the vertical axis. The needle drive controller 241 includes a correction processor 242.

The correction processor 242 corrects the coordinates of the descent position of the sampling needle 302 corresponding to each well 312. Specifically, it converts the initial values of the coordinates of the descent position corresponding to each well 312 by applying a correction formula previously set in the manufacturing process of the controller 100, taking into account the calibration information calculated by the calibration information calculator 23.

The plate identifier 25 determines the type of plate 311 placed on the sample rack 310. Specifically, the plate identifier 25 identifies the type of plate 311, i.e. the number and arrangement of the wells 312, by obtaining, from the photosensor 304, the read result of the identification information on the recognition area 314 of the plate 311 and comparing the obtained read result with a correspondence table (not shown) stored in the plate information storage section 43 (which will be described later).

The well number determiner 26 determines the numbers of the reference wells. Specifically, the well number determiner 26 compares the type of plate 311 determined by the plate identifier 25 with a position correspondence table 42 (which will be described later) and determines the number of the well 312 linked with each reference position of the plate 311 in question.

The image creator 27 creates a calibration process assisting image 600 which visually shows the numbers and position of the reference wells (see FIGS. 6B and 7A-7C). Specifically, the image creator 27 creates an image which shows the number of each reference well and the position of that well on the plate 311 based on the type of plate 311 determined by the plate identifier 25 and the numbers of the reference wells determined by the well number determiner 26.

The display controller 28 sends the display section 30 video signals of various kinds of information processed by the control section 20. In particular, in the present embodiment, the calibration process assisting image 600 created by the image creator 27 is displayed on the screen of the display section 30. The display controller 28 also has the function of displaying specified notification images, GUI buttons and other graphical components.

The display section 30 displays information handled by the controller 100. For example, it is realized using a display device, such as an LCD (liquid crystal display). The display section 30 is placed behind the touchscreen 10 in such a manner that it is covered by the touchscreen 10, displaying the GUI buttons and other graphical components to assist touch operations by the user.

The storage section 40 is a section for non-transitorily holding control programs and OS (operating system) programs executed by the control section 20 of the controller 100, an application programs for enabling the control section 20 to carry out various functions as the analyzer of the present invention, as well as various data to be read by the control section 20 in executing the application program. It is realized by a non-volatile storage device, such as a ROM (read only memory), flash memory, EPROM (erasable programmable ROM), EEPROM® (electrically EPROM), HDD (hard disc drive) and SSD (solid state drive). The storage section 40 includes a calibration information storage section 41, position correspondence table 42 and plate information storage section 43.

The calibration information storage section 41 holds calibration information calculated by the calibration information storage section 23, which information is used by the correction processor 242 in correcting the descent position of the sampling needle 302.

The position correspondence table 42 is a correspondence table which links each reference position with the number of a specified well 312 (i.e. reference well) and the number of the plate 311 on which this well 312 is provided. FIG. 3 shows one example of the data structure of the position correspondence table 42. In the shown position correspondence table 42, the number of each reference well and that of the plate 311 on which the same reference well is provided are specified for each type of plate 311.

The position correspondence table 42 in the shown example is created on the assumption that two plates 311 of the same type are placed on the sample rack 310. Therefore, there are three reference positions defined on the first plate 311a and one reference position on the second plate 311b. Positions #1-3 are used to determine the inclination of the first plate 311a in the horizontal plane. The second plate 311b, which is the same type as the first one, is assumed to have the same inclination as the first one. Position #4 is used to determine the spacing between the first and second plates 311a and 311b. In the case where different kinds of plates 311 are simultaneously placed, positions #1-3 may be defined for each plate 311.

The plate information storage section 43 holds various kinds of information for each type of plate 311. The "various kinds of information" specifically include the correspondence relationship between the type of plate 311 and the specific value of the identification information as well as a list of the descent-position coordinates of the sampling needle 302 corresponding to each well 312 provided in the plate 311. FIG. 4 shows an example of the latter. The well coordinates table 400 shows the correspondence relationship among the following items of information: the number which indicates the location of the plate 311 (in this example, a plate for 1.5-mL sample bottles) on the sample rack 310; the number assigned to each of the wells 312 provided on each plate 311; and the descent-position coordinates (x', y') of the sampling needle 302 corresponding to each of the wells 312. It should be noted that the coordinates in this table are initial values. In an actual analysis, the values (x, y) obtained by correcting (x', y') taking into account the previously described calibration information are used as the descent position of the sampling needle 302.

[Flow of Calibration Information Calculation Process]

Figure 5:
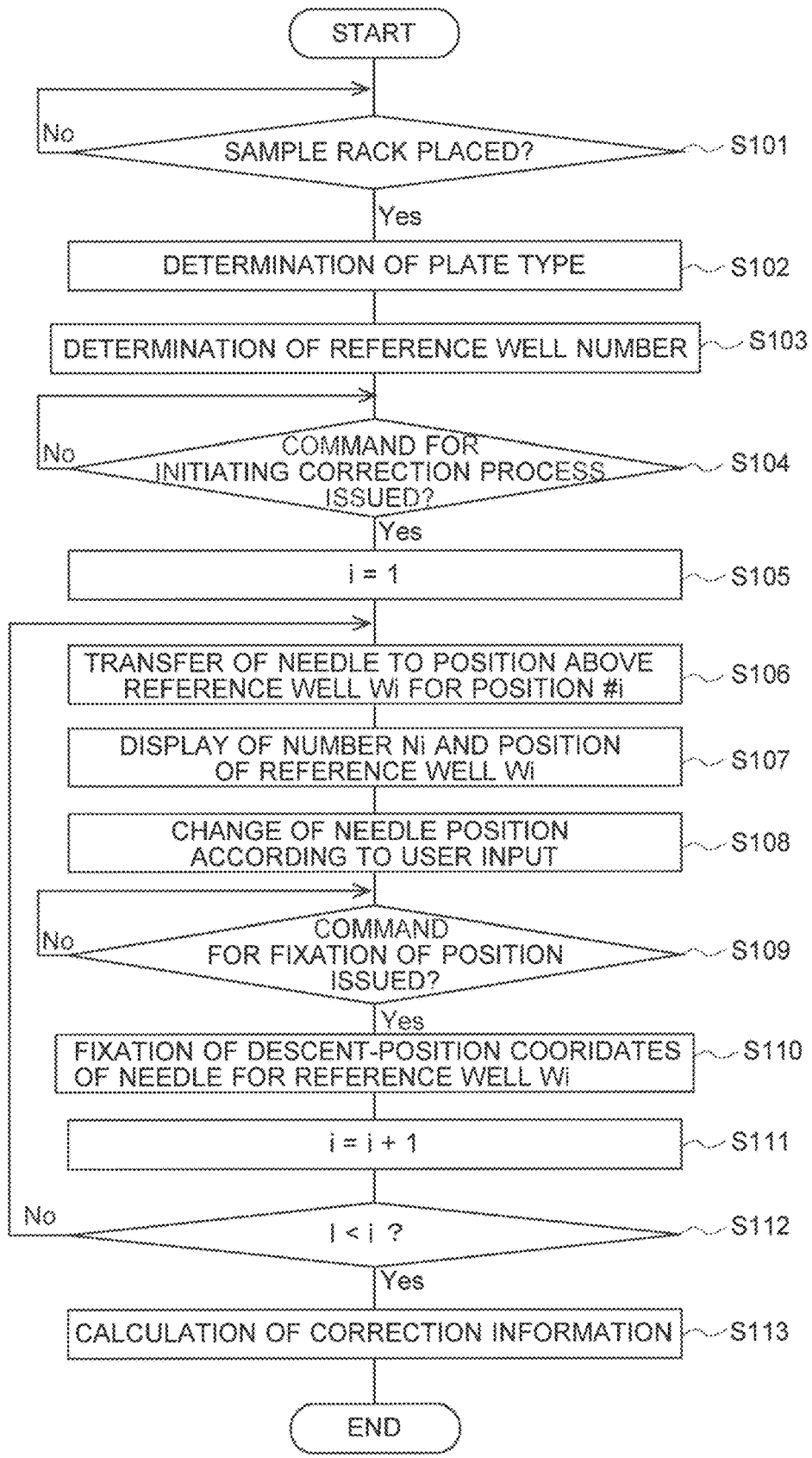
FIG. 5 is a flowchart showing the flow of the calibration information calculation process performed by the controller and auto-sampler in the embodiment.

The flow of the calibration information calculation process by the controller 100 and auto-sampler 300 is hereinafter described with reference to FIG. 5 which is a flowchart and FIGS. 6A-7C which are examples of the screen display created by the display section 30. Now, consider the situation that sample containers 313 have been placed in the wells 312 on each of the plates 311a and 311b by a user, and the sample rack 310 carrying those plates 311a and 311b has been placed in the sample-rack container unit 301 of the auto-sampler 300.

Then, the placement sensor (not shown) detects the placement of the sample rack 310 ("Yes" in Step S101), and the photosensor 304 reads the optical information on the recognition area 314. The read result is sent to the plate identifier 25 in the controller 100.

While no placement of the sample rack 310 is detected ("No" in Step S101), the system stands by until the placement is detected.

Next, the plate identifier 25 determines the type of plates 311a and 311b (Step S102). Specifically, the plate identifier 25 refers to the plate information storage section 43 to determine the type of plates 311a and 311b which corresponds to the optical information read by the photosensor 304.

Next, the well number determiner 26 determines the numbers of the reference wells (Step S103). Specifically, the well number determiner 26 refers to the position correspondence table 42 for the type of plates 311a and 311b identified by the plate identifier 25 in Step S102. Then, for the plates 311a and 311b currently placed on the sample rack 310, the well number determiner 26 determines the number of the well 312 linked with each reference position as well as the number of the plate 311 in which that well 312 is present.

Figure 6A:
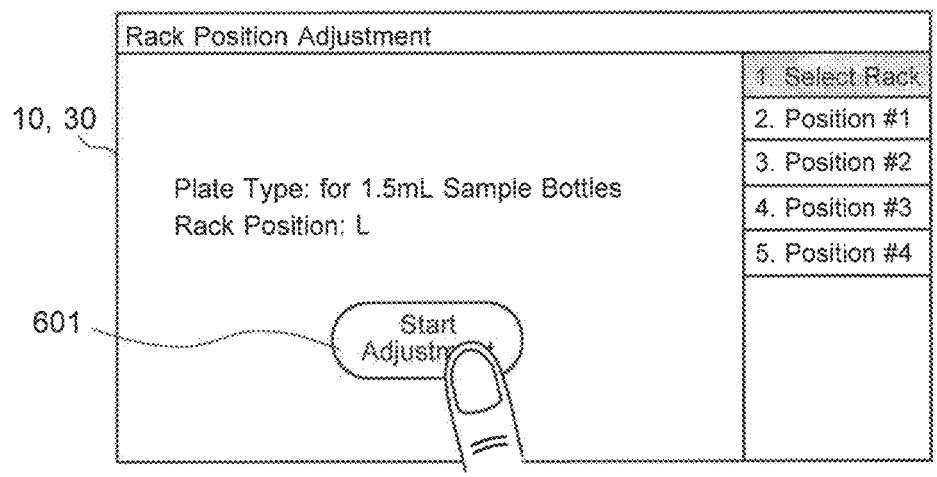
FIGS. 6A and 6B are examples of the screen display on the display section in the embodiment; specifically.

When a command for initiating the calibration process is issued by the user ("Yes" in Step S104), the needle drive mechanism 303 initially selects position #1 as the target (Step S105) and transfers the sampling needle 302 to a position above the reference well $W_1$ (Step S106). For example, as shown in FIG. 6A, the operation of issuing the "command for initiating the calibration process" in Step S104 is a tapping operation (the operation of lightly tapping the touchscreen 10 with a pointing object) within the area of the GUI button 601 for initiating the calibration process displayed on the screen of the display section 30. When the operation detector 21 detects the tapping operation within that area, the needle drive controller 241 refers to the position correspondence table 42 to identify the reference well $W_1$, designated as position #1, and subsequently refers to the well coordinates table 400 for the information related to that reference well $W_1$. Based on the initial values (x', y') of the descent-position coordinates of the sampling needle 302 specified for the reference well $W_1$, the needle drive controller 241 sends predetermined drive signals to the needle drive mechanism 303. According to these drive signals, the needle drive mechanism 303 transfers the sampling needle 302 to position (x', y').

Figure 6B:
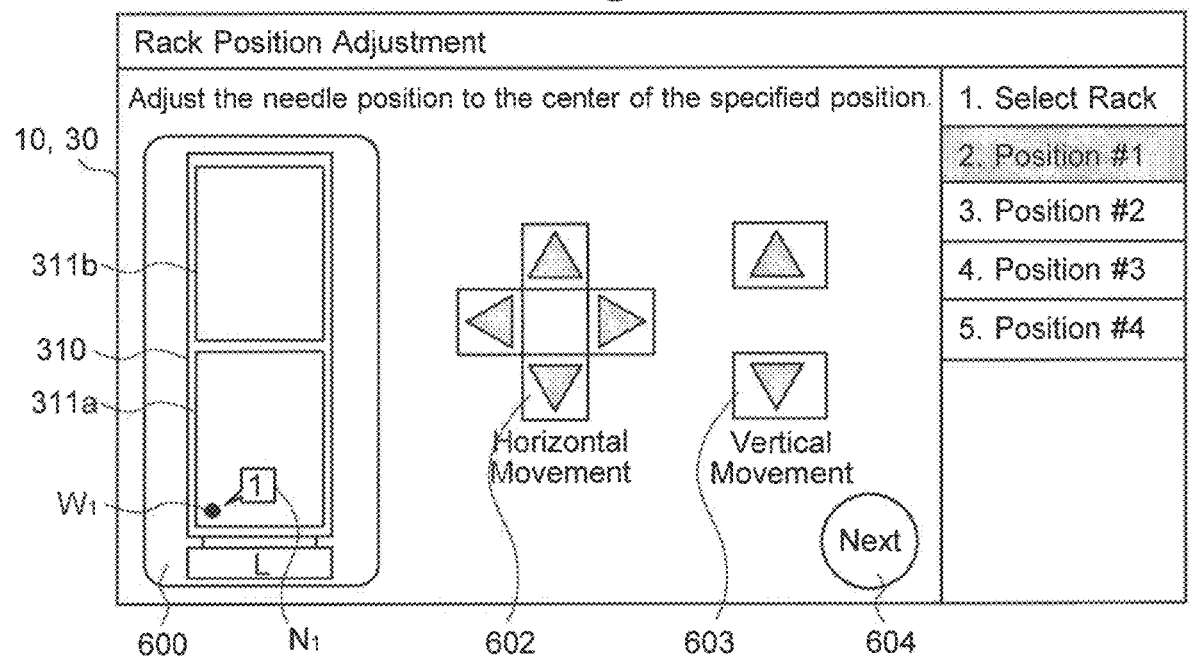

Next, the display controller 28 shows the number $N_1$ and position of the reference well $W_1$ on the screen of the display section 30 (Step S107). Specifically, this is performed as follows: Initially, the image creator 27 creates a calibration process assisting image 600 as shown in FIG. 6B based on the type of plates 311a and 311b determined in Step S102 as well as the number of the reference well determined in Step S103 and that of the plate 311 in which the reference well is present. The calibration process assisting image 600 is an image for visually presenting users the number $N_i$ of the reference well $W_i$ and its position on the plates 311a and 311b. The image creator 27 sends the created calibration process assisting image 600 to the display controller 28. The display controller 28 sends the display section 30 video signals for displaying this calibration process assisting image 600 on the screen of the display section 30.

Steps S106 and S107 may be performed in reverse order.

In Step S107 in the present embodiment, the display controller 28 also displays GUI components as shown in FIG. 6B, including the moving buttons 602 and 603 for changing the horizontal and vertical positions of the sampling needle 302 as well as the fixation button 604 for commanding the fixation of the descent position of the sampling needle 302. When the operation detector 21 detects a touch operation on the display areas of the moving buttons 602 and 603, the needle drive controller 241 in the analysis controller 24 sends the needle drive mechanism 303 predetermined drive signals according to the touch position, number of touches, duration and other information on the touch operation. According to those drive signals, the needle drive mechanism 303 changes the position of the sampling needle 302 by predetermined amounts in the horizontal and vertical directions (Step S108).

After that, when a command for fixing the position is issued by the user ("Yes" in Step S109), the position determiner 22 fixes the descent-position coordinates of the sampling needle 302 for the reference well $W_1$ (Step S110). Specifically, when the operation detector 21 detects a tap operation on the display area of the fixation button 604, the position determiner 22 obtains the coordinates of the current position of the sampling needle 302 in the horizontal plane from the needle drive controller 241 and fixes this position as the descent position of the sampling needle 302 for the reference well $W_1$. It also saves those coordinates in a temporary memory area.

Figure 7A:
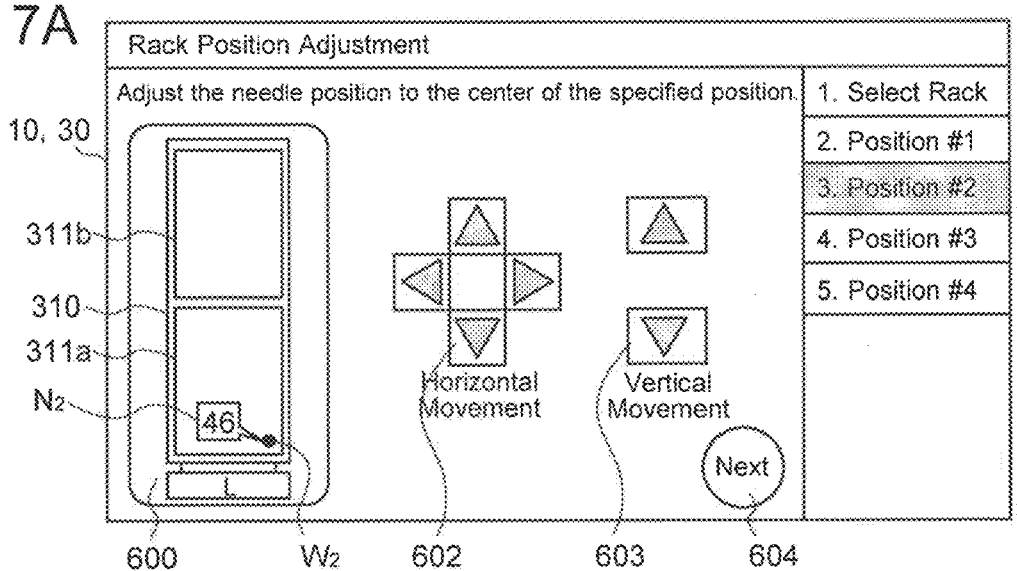
FIGS. 7A, 7B and 7C are the examples of the screen display created by the display section in the present embodiment in the process of adjusting the descent position for positions #2, #3 and #4, respectively.
Figure 7B:
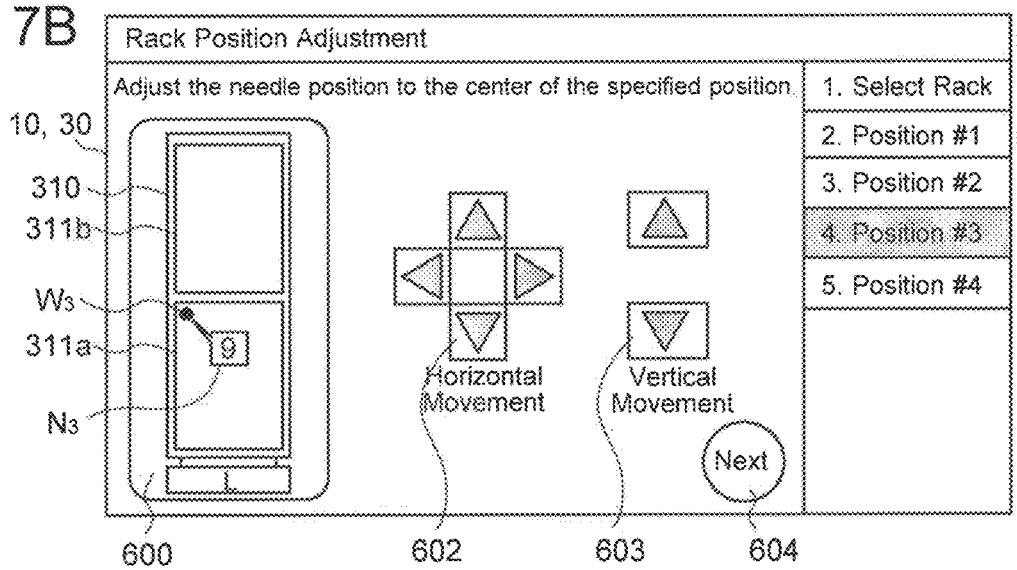
Figure 7C:
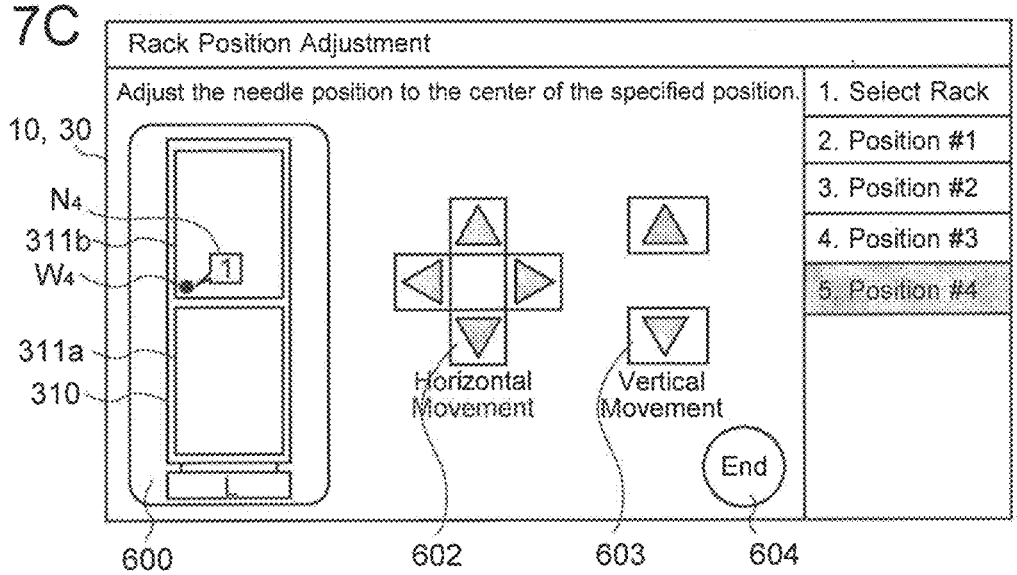

Subsequently, the position determiner 22 increases the value of parameter i by one (Step S111). If the new value of i is not greater than the total number I (in the present embodiment, I=4) of the previously set reference positions ("No" in Step S112), Steps S106 through S112 are performed for the next position # i. FIGS. 7A-7C respectively show examples of the screen display created by the display section 30 for positions #2-4 in Step S107.

Conversely, if the value of i increased by one in Step S111 is greater than I ("Yes" in Step S112), this judgment result means that the descent position of the sampling needle 302 for the reference well has been determined for all reference positions. Accordingly, the calibration information calculator 23 subsequently calculates the calibration information (Step S113). Specifically, for each reference well $W_i$, the calibration information calculator 23 calculates the difference between the values of the descent-position coordinates of the sampling needle 302 determined by the position determiner 22 in Step S110 and their initial values registered in the well coordinates table 400. The calculated difference values are saved as calibration information in the calibration information storage section 41.

The calibration information calculated in the present step will be referenced in an actual analysis by the correction processor 242 in correcting the descent-position coordinates of the sampling needle 302 for each well 312.

According to the processes described to this point, when the sample rack 301 carrying the plates 311a and 311b is placed in the sample-rack container unit 301 by a user, the reference wells $W_i$ which are designated according to the type of plates 311a and 311b are identified, and the number $N_i$ and position of each reference well $W_i$ are displayed on the screen of the display section 30. By viewing this screen, the user can recognize the number $N_i$ and position of the reference well $W_i$, i.e. the well 312 to which the sampling needle 302 should be guided. Comparing those pieces of information with the well numbers printed on the top surface of the plates 311a and 311b as well as the arrangement of the wells 312, the user can adjust the descent position of the sampling needle 302. This helps the user avoid guiding the sampling needle 302 to an incorrect well 312 which is not the reference well $W_i$.

Since the reference wells $W_i$ designated for the type of plates 311a and 311b are automatically identified, it is unnecessary for users to refer to the device manual every time the type of plate 311 is changed. This improves the user-friendliness of the system.

Second Embodiment

Figure 8:
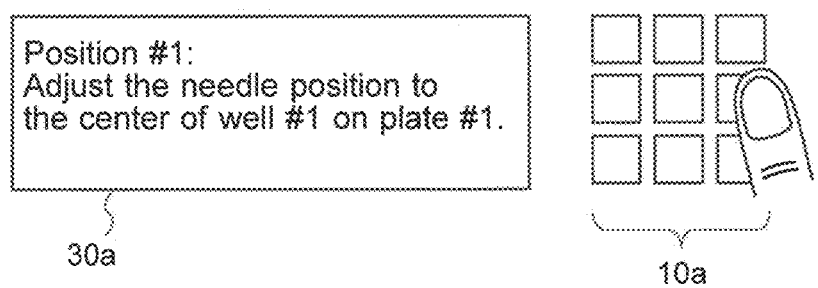
FIG. 8 is an example of the screen display created by the display section in the process of adjusting the descent position for position #1 in a sample-analyzing system according to the second embodiment of the present invention.

The system described in the first embodiment is configured to graphically present both the number $N_i$ of each reference well $W_i$ and its position on the plates 311a and 311b in the calibration process. As another embodiment, as shown in FIG. 8, the number $N_i$ of the reference well $W_i$ and that of the plate 311 may be displayed using characters on the display section 30a. In this embodiment, the image creator 27 described in the first embodiment is dispensable, since the calibration process assisting image 600 is not displayed. According to the present embodiment, even if the display section 30a is not fully capable of displaying graphical information, users can recognize the number $N_i$ and position of the reference well $W_i$ by character information. Additionally, in place of the GUI buttons 601-604 in the first embodiment, hardware buttons 10a as shown in FIG. 8 may be provided for the operation of moving the sampling needle 302.

Third Embodiment

Figure 9:
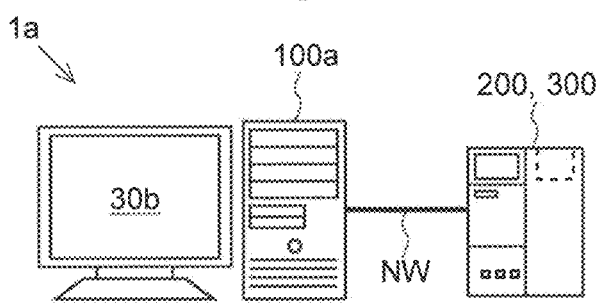
FIG. 9 is a diagram illustrating an overview of a sample-analyzing system according to the third embodiment of the present invention.
Figure 10:
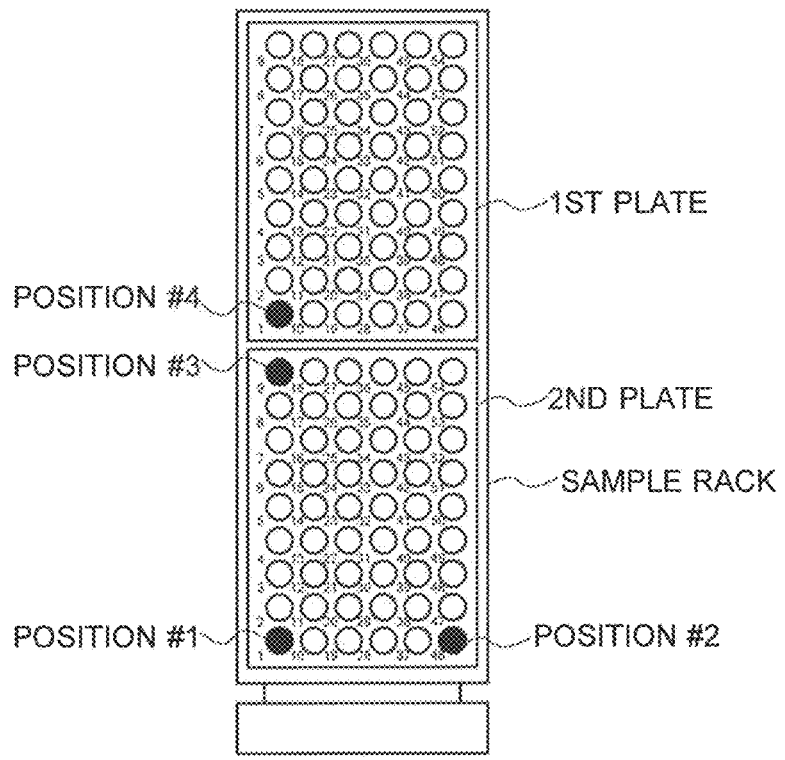
FIG. 10 is a top view of two plates placed on a sample rack along with the four reference wells designated for those plates.

As yet another embodiment, the display section in the present invention may be realized using an external device, as shown in FIG. 9. The display section 30b may be any display device having a screen on which the calibration process assisting image 600 can be displayed, such as a monitor offered with a personal computer (PC). In the present embodiment, the sample-analyzing system 1a is not a single apparatus; the system is composed of a PC 100a connected with the LC 200 and auto-sampler 300 via a network cable NW (or wireless LAN (local area network)). In this case, the operation section in the present invention should preferably be realized in the form of buttons or similar elements provided in the auto-sampler 300, although an input device offered with the PC 100a may alternatively be used as the operation section. The PC 100a only needs to have the functions of the image creator 27 and the display controller 28 described in the first embodiment; the other functions may be realized by a controller (not shown) provided in the auto-sampler 300. The image creator 27 is dispensable in the case where the number $N_i$ of the reference well $W_i$ and that of the plate 311 are displayed using characters as in the second embodiment.

According to the present embodiment, for example, the display control means can be realized by installing a specified program on the PC 100a. This provides an easy and highly flexible approach to assisting the calibration process.

The present invention is not limited to the previously described embodiments; those embodiments can be appropriately changed within the spirit of the present invention. For example, in the previous embodiments, two rectangular-parallelepiped plates 311 are placed on the sample rack 310. However, the present invention can also be similarly applied in the case where disc-shaped plates are used or in the case where the number of plates to be placed is one, three or more. In the case where the sample rack is configured to carry only one plate, the "plate" field in the position correspondence table 42 and well coordinates table 400 is dispensable.

In the previous embodiments, the inclination of the first plate is determined from three points (positions #1-3) on the plate. It is also possible to use two, four or more points.

In the first embodiment, the initial values of the descent-position coordinates of the sampling needle 302 corresponding to each well 312 are previously specified in the well coordinates table 400 shown in FIG. 4, and the correction processor 242 is configured to correct those initial values. It is not always necessary to previously assign coordinate values to all wells 312 in this manner. The coordinate values of each individual well may be calculated as needed. For example, once the descent-position coordinates of the sampling needle 302 for the reference wells have been determined, the descent-position coordinates for the remaining wells 312 can be calculated based on the arrangement of the wells 312 on the plate 311. In this configuration example, it is not always necessary to determine the difference between the initial values and fixed values of the descent-position coordinates of the sampling needle 302 corresponding to the reference wells.

REFERENCE SIGNS LIST 1, 1a . . . Sample-Analyzing System
10 . . . Touchscreen
100 . . . Controller
100a . . . Personal Computer (PC)
10a . . . Hardware Button
20 . . . Control Section
200 . . . Liquid Chromatograph (LC)
202 . . . Liquid-Sending Pump
204 . . . Column Oven
21 . . . Operation Detector
22 . . . Position Determiner
23 . . . Calibration Information Calculator
24 . . . Analysis Controller
241 . . . Needle Drive Controller
242 . . . Correction Processor
25 . . . Plate Identifier
26 . . . Well Number Determiner
27 . . . Image Creator
28 . . . Display Controller
30, 30a, 30b . . . Display Section
300 . . . Auto-Sampler
301 . . . Sample-Rack Container Unit
302 . . . Sampling Needle
303 . . . Needle Drive Mechanism
304 . . . Photosensor
310 . . . Sample Rack
311 . . . Plate
311a . . . First Plate
311b . . . Second Plate
312 . . . Well
313 . . . Sample Container
314 . . . Recognition Area
40 . . . Storage Section
400 . . . Well Coordinates Table
41 . . . Calibration Information Storage Section
42 . . . Position Correspondence Table
43 . . . Plate Information Storage Section
600 . . . Calibration Process Assisting Image
$N_1, N_2, N_3, N_4$ . . . Well Number
$W_1, W_2, W_3, W_4$ . . . Reference Well

The invention claimed is:

1. A sample introduction system for sequentially introducing a plurality of samples into an analyzer configured to analyze a sample contained in a plurality of wells provided on at least one plate placed on a sample rack, or a sample contained in sample containers placed in the plurality of wells, the sample introduction system comprising:

an auto-sampler including a sampling needle, the auto-sampler configured to suction, via the sampling needle, the sample from the plurality of wells or the sample containers; the auto-sampler also including a needle drive mechanism configured to drive the sampling needle in horizontal and vertical directions;

an operation section configured to receive a command from a user to control the needle drive mechanism to drive the sampling needle;
a display section;
a storage portion; and
a processor configured to:
- determine a number of reference wells for the at least one plate, the reference wells being among the plurality of wells provided on the plate;
- display, on a screen of the display section, an identification of each reference well for the at least one plate, the identification of each reference well including a well number and position defined in reference to the at least one plate;
- initiate a correction process based on a command from the user, wherein the correction process includes:
  - controlling the needle drive mechanism to drive the sampling needle to an initial descent position, which is a position intended to be above a reference well of the reference wells for the at least one plate, the initial descent position being based on initial values stored in the storage portion;
  - calculating correction information for the reference well of the reference wells for the at least one plate based on input from the user provided to the operation section, wherein the user issues the command to control the needle drive mechanism to drive the sampling needle to a fixing descent position, which is a position above the reference well of the reference wells for the at least one plate; and
  - using the correction information to sequentially introduce the plurality of samples into the analyzer.

2. The sample introduction system according to claim 1, wherein the processor is further configured to:
determine a type of the at least one plate placed on the sample rack.

3. A controller for controlling an operation of an auto-sampler in a sample introduction system for sequentially introducing a plurality of samples into an analyzer having the auto-sampler and an operation section, the auto-sampler including: a sampling needle configured to suction a sample contained in a plurality of wells provided on at least one plate placed on a sample rack or a sample contained in sample containers placed in the plurality of wells, and a needle drive mechanism configured to drive the sampling needle in horizontal and vertical directions; the operation section configured to receive a command from a user to control the needle drive mechanism to drive the sampling needle, the controller comprising:
a storage section, and
a processor configured to:
- determine a number of reference wells for the at least one plate, the reference wells being among the plurality of wells provided on the plate;
- display, on a screen of a display section, an identification of each reference well for the at least one plate, the identification of each reference well including a well number and position defined in reference to the at least one plate;
- initiate a correction process based on a command from the user, wherein the correction process includes:
  - controlling the needle drive mechanism to drive the sampling needle to an initial descent position, which is a position intended to be above a reference well of the reference wells for the at least one plate, the initial descent position being based on initial values stored in the storage portion;
  - calculating correction information for the reference well of the reference wells for the at least one plate based on input from the user provided to the operation section, wherein the user issues the command to control the needle drive mechanism to drive the sampling needle to a fixing descent position, which is a position above the reference well of the reference wells for the at least one plate; and
  - using the correction information to sequentially introduce the plurality of samples into the analyzer.

4. The controller according to claim 3, wherein the processor is further configured to:
determine a type of the at least one plate placed on the sample rack.

5. A non-transitory computer readable medium recording a control program for controlling an operation of an auto-sampler in a sample introduction system for sequentially introducing a plurality of samples into an analyzer having the auto-sampler and an operation section, the auto-sampler including: a sampling needle configured to suction a sample contained in a plurality of wells provided on at least one plate placed on a sample rack or a sample contained in sample containers placed in the plurality of wells, and a needle drive mechanism configured to drive the sampling needle in horizontal and vertical directions; the operation section configured to receive a command from a user to control the needle drive mechanism to drive the sampling needle, wherein:
the control program controls a storage section and a processor of a computer,
the processor configured to: determine a number of reference wells for the at least one plate, the reference wells being among the plurality of wells provided on the plate;
display, on a screen of a display section, an identification of each reference well for the at least one plate, the identification of each reference well including a well number and position defined in reference to the at least one plate;
initiate a correction process based on a command from the user, wherein the correction process includes:
  controlling the needle drive mechanism to drive the sampling needle to an initial descent position, which is a position intended to be above a reference well of the reference wells for the at least one plate, the initial descent position being based on initial values stored in the storage portion;
  calculating correction information for the reference well of the reference wells for the at least one plate based on input from the user provided to the operation section, wherein the user issues the command to control the needle drive mechanism to drive the sampling needle to a fixing descent position, which is a position above the reference well of the reference wells for the at least one plate; and
using the correction information to sequentially introduce the plurality of samples into the analyzer.

6. The non-transitory computer readable medium according to claim 5, wherein the processor is further configured to:

determine a type of the at least one plate placed on the sample rack.

\* \* \* \* \*